ISIDORE BIRGE.
BOXES FOR ARTIFICIAL FLOWERS.

No. 183,530. Patented Oct. 24, 1876.

Witnesses:
Lewis F. Brow,
A. P. Grant.

Inventor:
Isidore Birge.
by
Attorney.

UNITED STATES PATENT OFFICE.

ISIDORE BIRGÉ, OF PHILADELPHIA, PENNSYLVANIA.

IMPROVEMENT IN BOXES FOR ARTIFICIAL FLOWERS.

Specification forming part of Letters Patent No. 183,530, dated October 24, 1876; application filed March 2, 1876.

*To all whom it may concern:*

Be it known that I, ISIDORE BIRGÉ, of the city and county of Philadelphia, and State of Pennsylvania, have invented a new and useful Box for Flowers; and I do hereby declare the following to be a clear and exact description of the nature thereof, sufficient to enable others skilled in the art to which my invenvention appertains to fully understand, make, and use the same, reference being had to the accompanying drawings, making part of this specification, in which—

Figure 1:
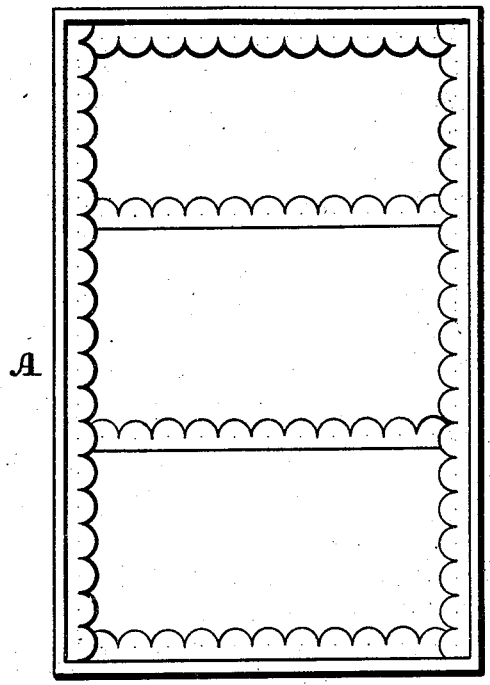
Figure 2:
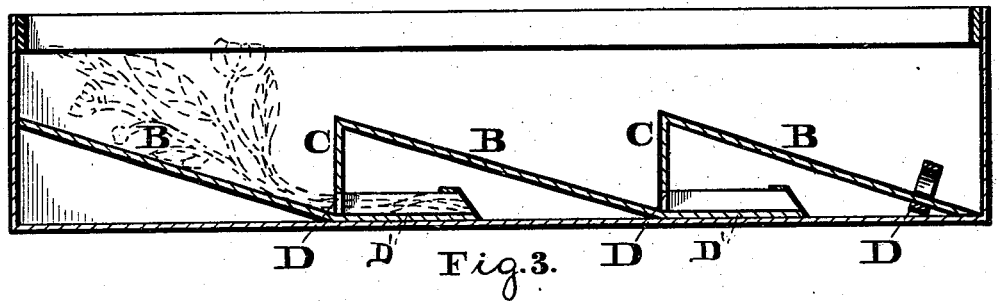
Figure 3:
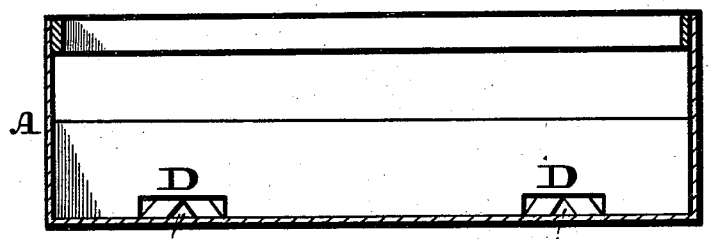
Figure 4:
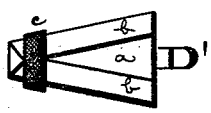

Figure 1 is a top view of the body of the box. Fig. 2 is a longitudinal section thereof. Fig. 3 is a transverse section thereof. Fig. 4 is a top view of one of the sockets.

Similar letters of reference indicate corresponding parts in the several figures.

My invention consists of a box having on its bottom inclined beds, which are supported on uprights formed with openings, whereby the flowers placed on the beds may be readily viewed and inspected, and the stems enter the openings in the supports so as to be concealed by the adjacent beds. It also consists of sockets of tapering shape for receiving, gathering, and holding the stems of the flowers.

Referring to the drawings, A represents a box, on the bottom of which there are placed beds B B, which are supported at one end on uprights C, so that the beds are raised at one end, and they occupy inclined positions. At the base of the uprights C, or lower ends of the beds B, there are openings D, which extend in the longitudinal direction of the box. D' represents sockets, which are constructed of pieces *a*, with sides *b* turned up therefrom, forming tapering-shaped bodies. Bands *c* are passed around the sockets, so as to prevent opening out of the sides *b*, and to preserve the shape of the sockets.

The operation is as follows: The stems of the sprays or flowers will be inserted into the sockets D', and the bodies of the sprays rested on the beds B, and in this position the sprays or flowers will be firmly supported, advantageously presented for viewing and inspection, and may be transported without liability to intermingle, whereby, also, the sprays will preserve their original shape and value.

It will be seen that when the stems are inserted in the openings D they enter the sockets D', and are gathered and held by the sockets, which, owing to their tapering form and the overhanging nature of the sides *b b*, securely hold the stems. Moreover, the sockets and stems will be concealed by the beds above them, and thus only the flowers proper will be exposed. The box will be more especially designed for artificial flowers.

Having thus described my invention, what I claim as new, and desire to secure by Letters Patent, is—

1. The inclined beds B, supported at one end on the uprights C, which are formed with openings D at their lower ends, substantially as and for the purpose set forth.

2. The inclined beds B and uprights C with openings D, in combination with the tapering sockets D', projecting from the uprights and communicating with the openings thereof, substantially as and for the purpose set forth.

ISIDORE BIRGÉ.

Witnesses:
 JOHN A. WIEDERSHEIM,
 H. E. HINDMARSH.